US007110013B2

United States Patent
Ebersole et al.

(10) Patent No.: US 7,110,013 B2
(45) Date of Patent: Sep. 19, 2006

(54) AUGMENTED REALITY DISPLAY INTEGRATED WITH SELF-CONTAINED BREATHING APPARATUS

(75) Inventors: John Franklin Ebersole, Bedford, NH (US); John Franklin Ebersole, Jr., Bedford, NH (US); Todd Joseph Furlong, Goffstown, NH (US)

(73) Assignee: Information Decision Technology, Bedford, NH (US)

( * ) Notice: Subject to any disclaimer, the term of this patent is extended or adjusted under 35 U.S.C. 154(b) by 379 days.

(21) Appl. No.: 09/927,043

(22) Filed: Aug. 9, 2001

(65) Prior Publication Data

US 2002/0039085 A1    Apr. 4, 2002

Related U.S. Application Data

(63) Continuation-in-part of application No. 09/525,983, filed on Mar. 15, 2000.

(60) Provisional application No. 60/225,343, filed on Aug. 15, 2000.

(51) Int. Cl.
*G09G 5/00*    (2006.01)

(52) U.S. Cl. .......................................... 346/8; 345/630

(58) Field of Classification Search .................. 345/7, 345/8, 9, 53, 980; 250/330, 359; 359/630, 359/629; 382/103
See application file for complete search history.

(56) References Cited

U.S. PATENT DOCUMENTS

| | | | | |
|---|---|---|---|---|
| 4,884,219 A | * | 11/1989 | Waldren | 345/8 |
| 5,274,405 A | * | 12/1993 | Webster | 351/158 |
| 5,541,579 A | * | 7/1996 | Kiernan | 340/573.1 |
| 5,583,795 A | * | 12/1996 | Smyth | 702/150 |
| 5,646,783 A | * | 7/1997 | Banbury | 359/630 |
| 5,991,085 A | * | 11/1999 | Rallison et al. | 359/630 |
| 6,008,780 A | * | 12/1999 | Clarke et al. | 345/8 |
| 6,018,630 A | * | 1/2000 | Arai et al. | 396/51 |
| 6,037,914 A | * | 3/2000 | Robinson | 345/7 |
| 6,064,749 A | * | 5/2000 | Hirota et al. | 382/103 |
| 6,222,675 B1 | * | 4/2001 | Mall et al. | 359/630 |
| 6,411,266 B1 | * | 6/2002 | Maguire, Jr. | 345/8 |
| 6,456,261 B1 | * | 9/2002 | Zhang | 345/8 |
| 6,476,391 B1 | * | 11/2002 | Zhang | 250/330 |
| 6,757,068 B1 | * | 6/2004 | Foxlin | 356/620 |
| 2002/0075201 A1 | * | 6/2002 | Sauer et al. | 345/7 |
| 2003/0165017 A1 | * | 9/2003 | Amitai | 359/636 |

* cited by examiner

*Primary Examiner*—Amare Mengistu
(74) *Attorney, Agent, or Firm*—Brian M. Dingman (57) ABSTRACT

A system for creating an augmented reality display coupled with a firefighter's self-contained breathing apparatus (SCBA) mask. The invention combines a camera, motion tracking sensor, head-mounted display, SCBA mask, and optional head phones into a display suitable for performing exercises, such as training of firefighters or other emergency first responders, in augmented reality.

24 Claims, 12 Drawing Sheets

FIG 3A
Copyright © 2000 Creative Optics, Inc. *All Rights Reserved.*

FIG 3B
Copyright © 2000 Creative Optics, Inc. *All Rights Reserved.*

FIG 4
Copyright © 2000 Creative Optics, Inc. *All Rights Reserved.*

FIG 5A
Copyright © 2000 Creative Optics, Inc. *All Rights Reserved.*

FIG 5B
Copyright © 2000 Creative Optics, Inc. *All Rights Reserved.*

FIG 6A
Copyright © 2000 Creative Optics, Inc. *All Rights Reserved.*

FIG 6B

Copyright © 2000 Creative Optics, Inc. *All Rights Reserved.*

FIG 6C

Copyright © 2000 Creative Optics, Inc. *All Rights Reserved.*

FIG 7A
Copyright © 2000 Creative Optics, Inc. *All Rights Reserved.*

FIG 7B
Copyright © 2000 Creative Optics, Inc. *All Rights Reserved.*

AUGMENTED REALITY DISPLAY INTEGRATED WITH SELF-CONTAINED BREATHING APPARATUS

CROSS REFERENCE TO RELATED APPLICATIONS

This application claims priority of Provisional patent application 60/225,343 filed Aug. 15, 2000, and is a Continuation in Part of "Augmented Reality-Based Firefighter Training System and Method" Ser. No. 09/525,983 filed Mar. 15, 2000.

GOVERNMENT RIGHTS

This invention was made with Government support under Contract Number N61339-98-C-0036 awarded by the Department of Navy. The Government has certain rights in the invention.

FIELD OF THE INVENTION

This invention relates to the fields of augmented reality and firefighter/emergency first responder training and operations. Specifically, the invention relates to an augmented reality display device to be used for firefighter or other emergency first responder training or other activities.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

Augmented Reality (AR) is emerging as a technology for assistance in performing a variety of tasks. AR systems can be used to allow firefighters and other emergency first responders to train using real equipment and virtual fire and smoke. As part of making the experience realistic for firefighter trainees, it is important that the AR experience resemble the real experience as closely as possible. Therefore, it is important to integrate an AR system into real or mockup fire fighting equipment.

SUMMARY OF THE INVENTION

The purpose of the invention is to augment the experience of a user in a computer-enhanced fire-training scenario such that the user actually wears equipment that would be worn in a real fire. Specifically, the invention augments the experience by allowing the user to wear a firefighter's SCBA (Self-Contained Breathing Apparatus) while engaging in computer-enhanced fire training situations. Key aspects of the invention include (1) a real firefighter's SCBA, including catcher's mask-style straps, which gives the user the sensation of being in a real firefighting situation, (2) a head motion tracker, which is mounted on the SCBA to track the position and orientation of the firefighter's head, (3) a specially mounted camera and mirror configuration which takes a video image of what is directly in front of the user's eyes, (4) a video display screen, which is used to project the computer-enhanced image the firefighter will see in front of his eyes, and (5) specially mounted head phones which can be used to project appropriate sounds into the firefighter's ears.

The invention provides sufficient accuracy in real-time such that a computer can generate virtual images and mix them with the image data from the specially mounted camera in a way that the user sees the virtual and real images mixed in real time. The head-mounted tracker allows a computer to synchronize the virtual and real images such that the user sees an image being updated correctly with his or her head. The headphones further enhance the virtual/real experience by providing appropriate aural input.

DETAILED DESCRIPTION OF THE PREFERRED EMBODIMENTS OF THE INVENTION

Figure 1:
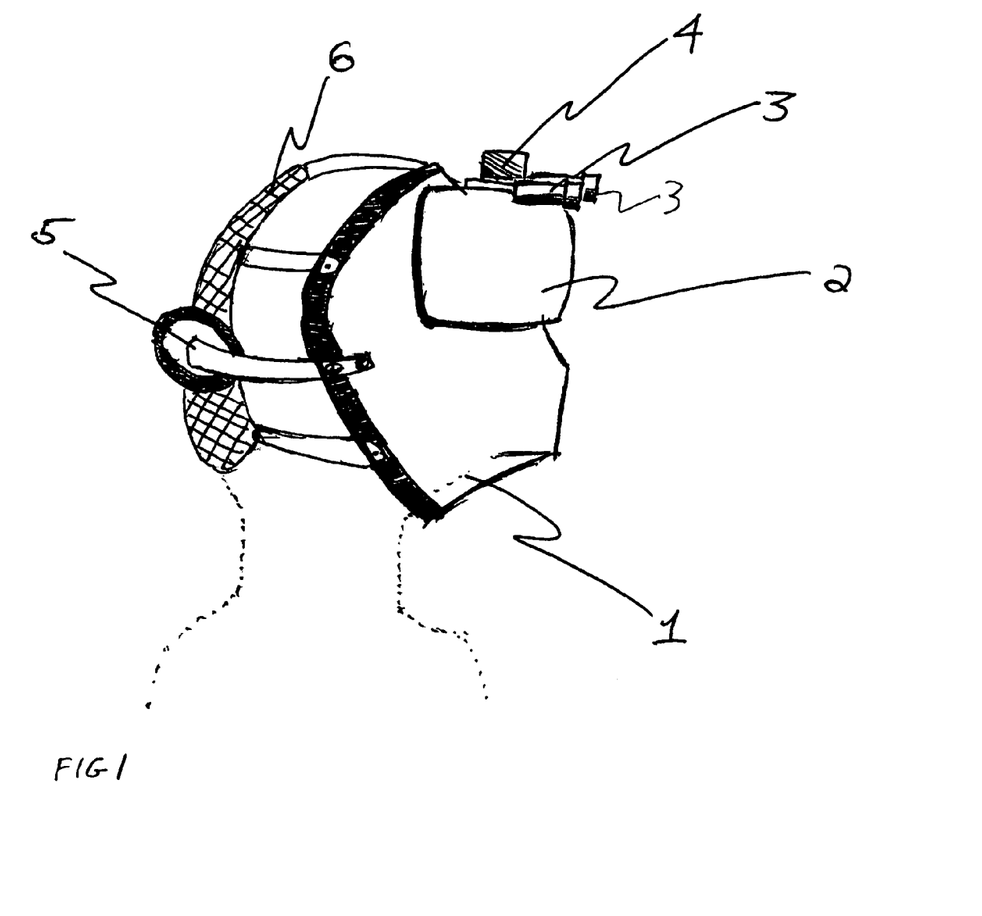
FIG. 1 is a diagram of the main components of the invention.

FIG. 1 summarizes the main components of the invention. The major components of this invention are one or two video cameras 3, a motion tracker 4, a head-mounted display (HMD) 2, headphones 5, and a self-contained breathing apparatus (SCBA) mask 1 with a "catcher's mask" style straps 6 to hold the SCBA onto the wearer's head.

Camera

Any sufficiently lightweight video camera 3 can be used for this invention. A PANASONIC® (Matsushita Electric Corporation of America, One Panasonic Way, Secaucus, N.J. 07094) GP-KS162 micro ("lipstick" style) camera with a 7 mm lens (GP-LM7TA) is preferably used in the invention. Because the camera must be worn on the user's head, it should be lightweight and minimally obtrusive. The camera's field of view (FOV) must be close to that of the HMD for minimal distortion, i.e., to best map the image of the real world to the AR world; this also contributes to maximizing the user's perception of presence in the AR world. If the HMD is an optical see-through display, the camera is not required. However, the current preferred embodiment of the invention is a video-based AR display.

Figure 2:
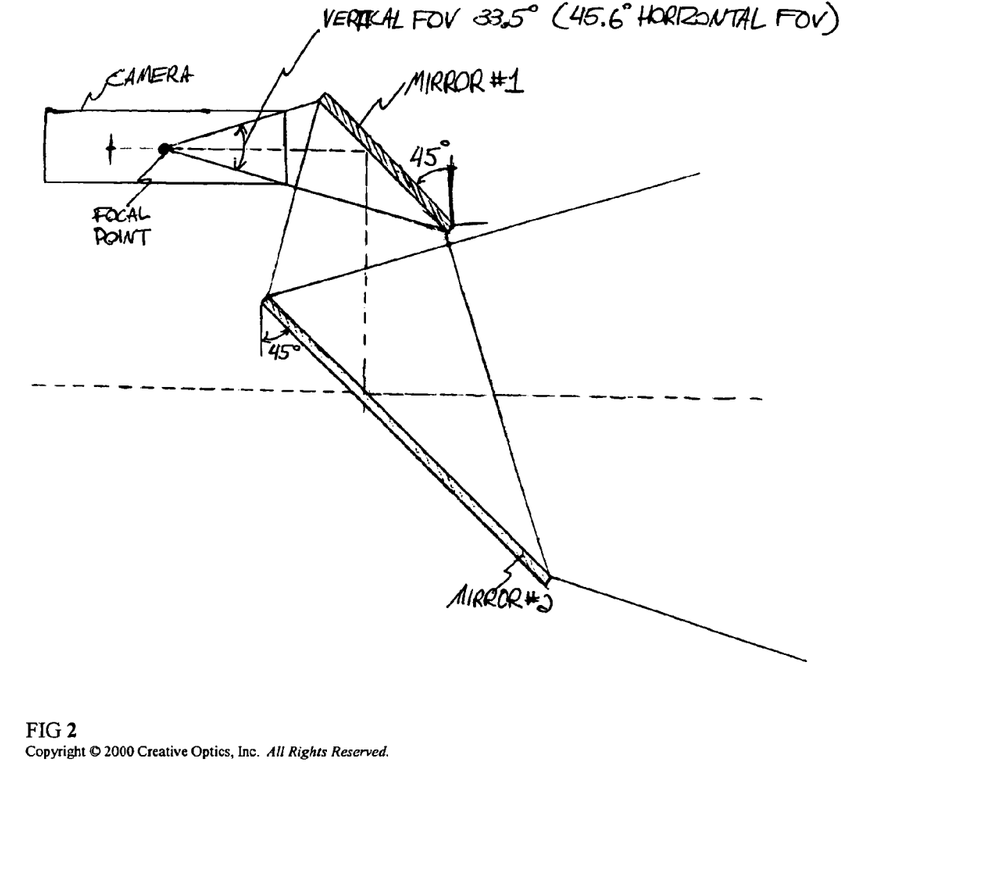
FIG. 2 is a diagram of a two-mirror layout for placing the camera viewpoint immediately in front of the wearer's eyes.

The ideal location of a camera for minimal offset from the wearer's eyes is inside the user's eyes. Of course, this is impractical, so the optical path may be folded using mirrors to allow the camera viewpoint to coincide with the wearer's eye location with the camera at some distance from the wearer's eyes. Using an even number of mirrors as in FIG.

2 allows the camera images to be used as-is, and using an odd number of mirrors requires the camera image to be flipped before it is displayed to the wearer of the display.

Figure 3A:
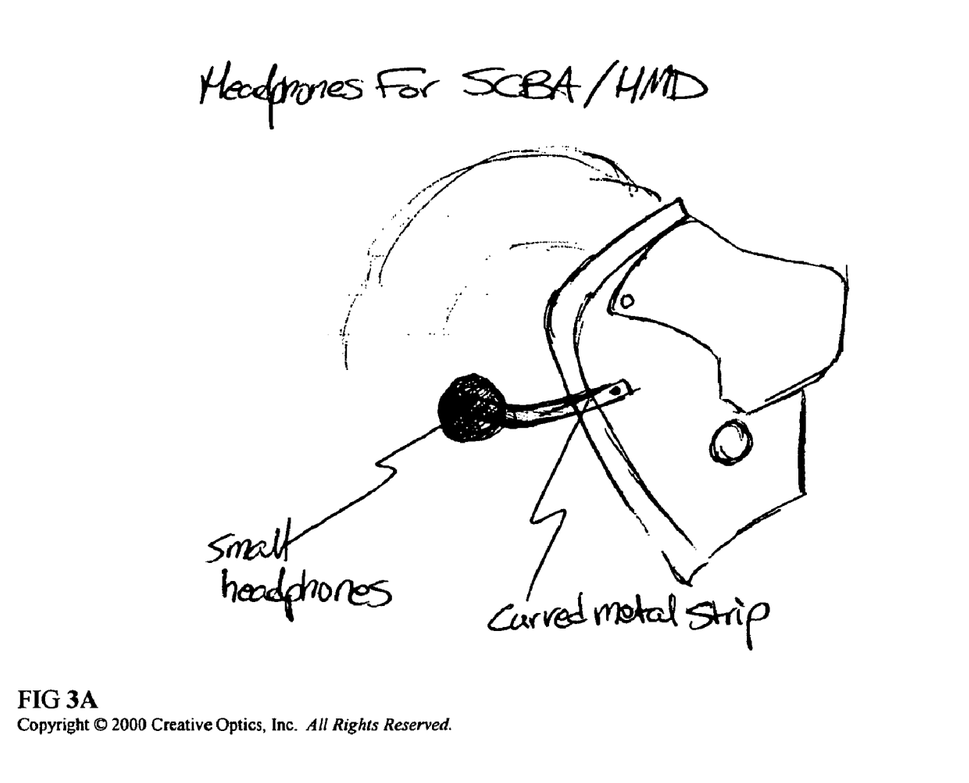
FIG. 3A is a diagram of a headphone attachment design.
Figure 3B:
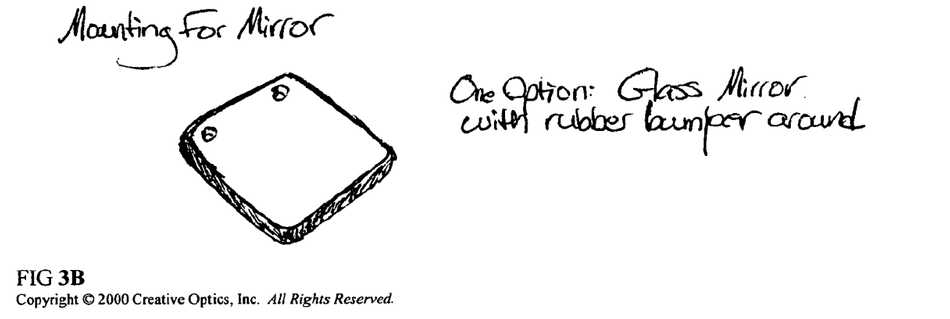
FIG. 3B is a diagram of a bumper that can be used to protect a mirror.
Figure 4:
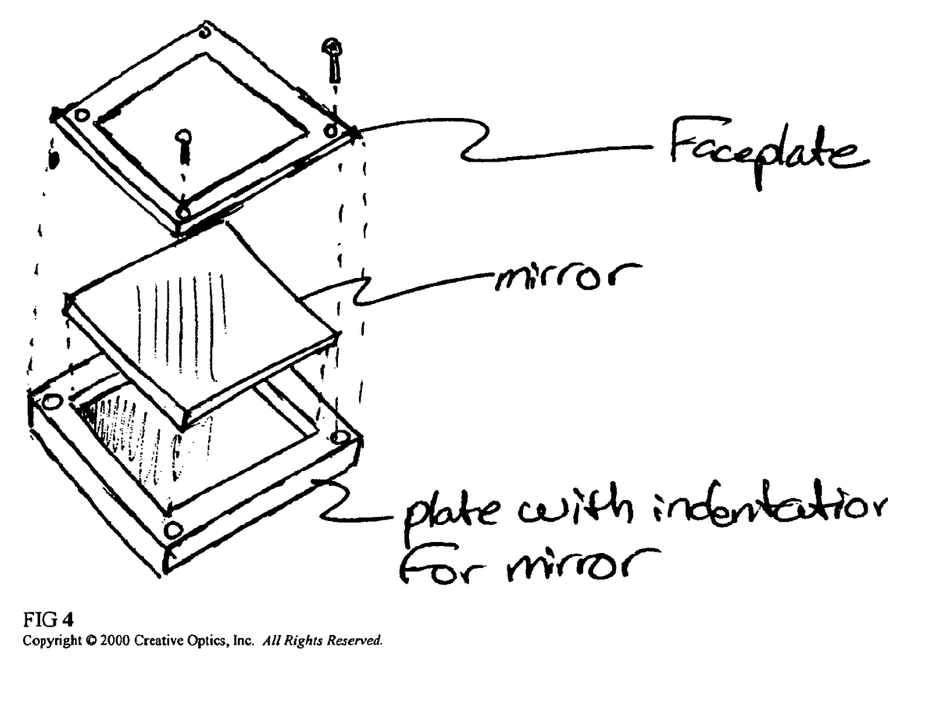
FIG. 4 is an exploded view of a mirror mount design that places minimum pressure on the mirror to minimize distortion due to compression.
Figure 5A:
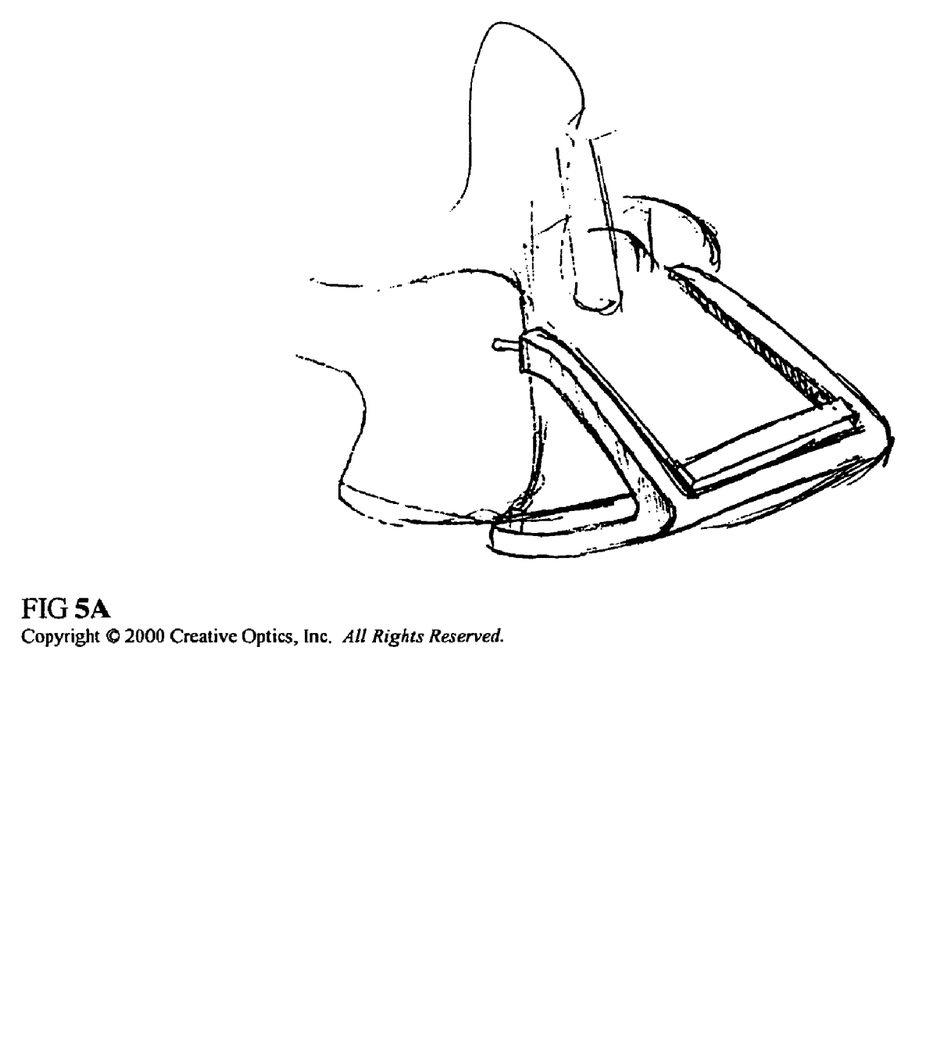
FIG. 5A depicts a structure that can be used to protect a mirror from being bumped and to prevent the mirror mount from being hooked from underneath.
Figure 5B:
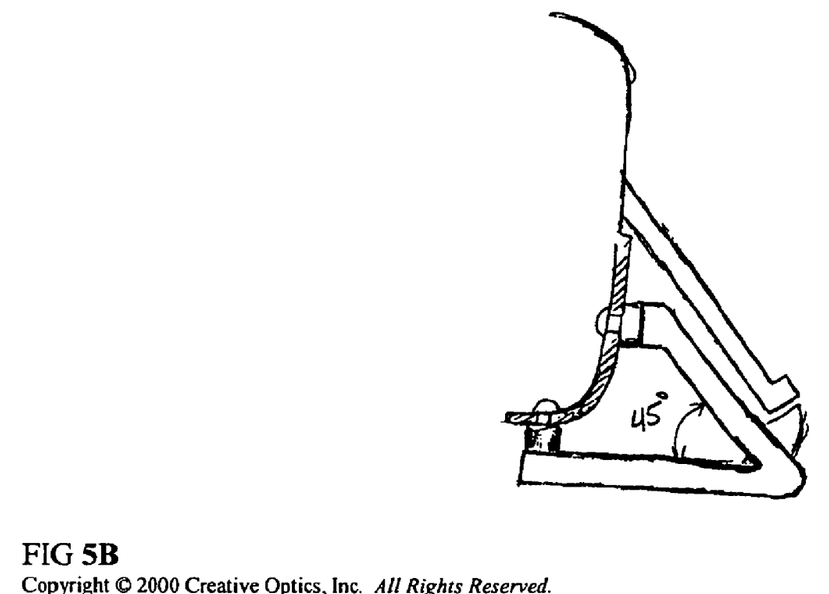
FIG. 5B is a cross-sectional view of the structure of FIG. 5A.
Figure 6A:
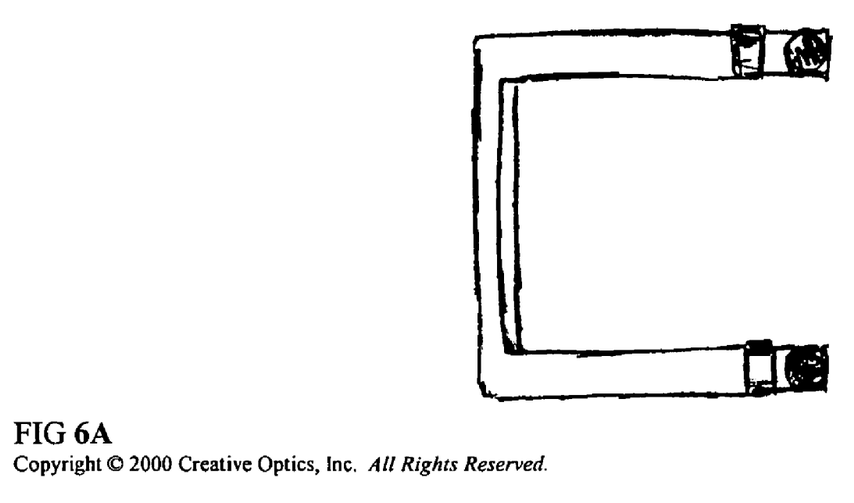
FIGS. 6A–C are top, side, and end views, respectively, of the structure in FIG. 5.
Figure 6B:
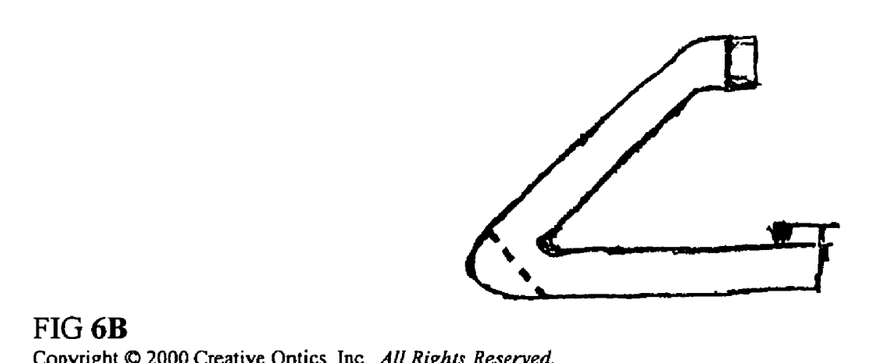
Figure 6C:
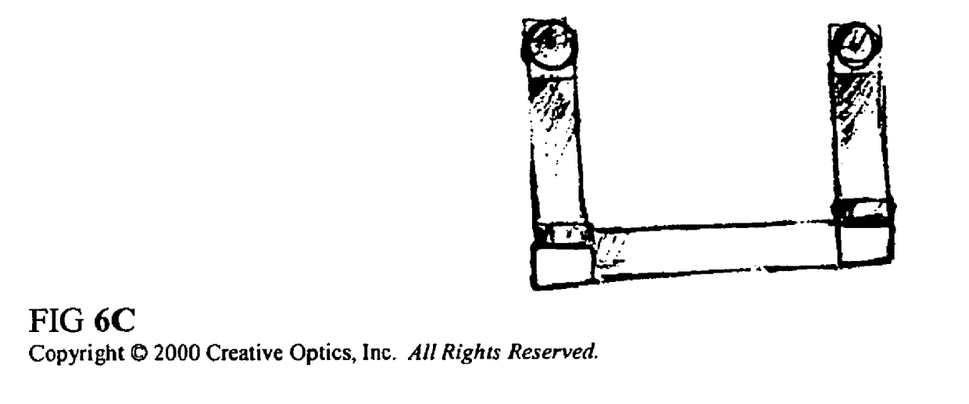
Figure 7A:
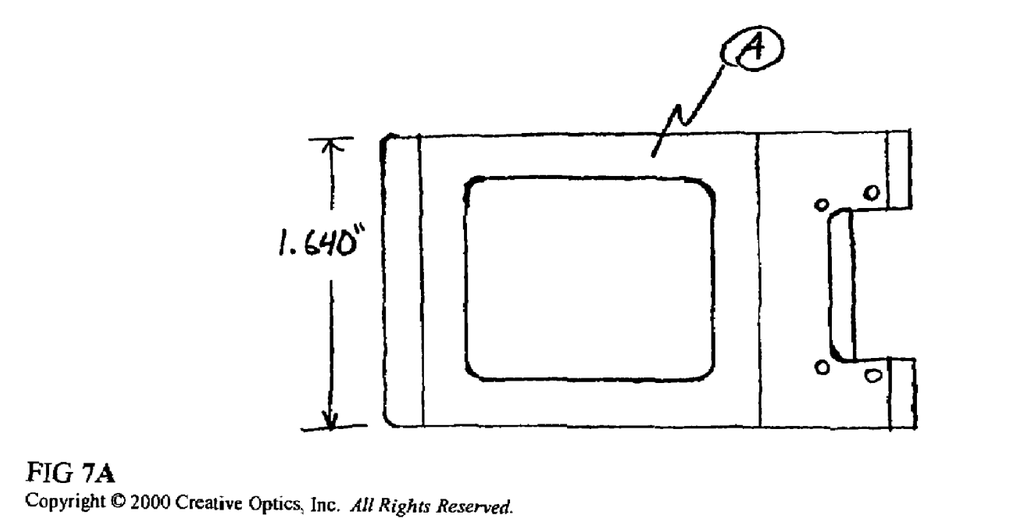
FIGS. 7A and 7B are top and side views, respectively, of a rugged mirror mount.
Figure 7B:
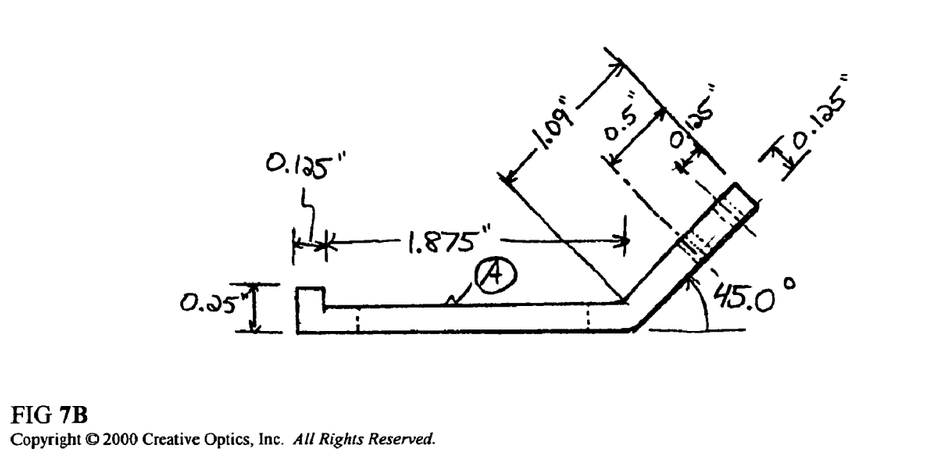

Mounting of the mirror is a challenge because the mirror must be exposed, yet must also be protected. FIG. 3B shows a bumper design for protecting the mirror and whatever the mirror may bump against. FIG. 4 shows a mirror mount design that both protects the mirror and allows a minimal amount of pressure to be applied to the mirror, reducing the distortion that is created, especially with plastic mirrors. FIG. 5 and FIG. 6 show an angular frame structure to shield the mirror mount and prevent it from getting hooked from underneath. FIG. 7 shows an alternative rugged mirror mount with a raised area at the front to prevent the mirror from getting bumped from that direction.

For a stereoscopic embodiment of the invention, two cameras 3 are required, FIG. 1. They should be spaced the same distance apart as the wearer's eyes and possibly have an interpupillary distance (IPD) adjustment. Each camera 3 can be mounted similarly to the way a single camera mount is described above.

Motion Tracker

Motion tracking equipment 4 is used to provide real-time, 6 degree of freedom (DOF), position and orientation information about a tracked object. By attaching a motion tracker rigidly to the camera, the camera can be tracked. Knowledge of the camera field of view and its position and orientation allows a computer to overlay computer-generated images on the camera video that appear to be anchored to locations in 3-D space. Alternatively, attaching the tracker to a user's head allows the user's eye positions to be tracked, enabling the see-through embodiment of this technology. Any tracker that provides suitable 6 DOF measurements can be used as a part of this invention. Example technologies for motion tracking include magnetic, acousto-inertial, and optical. Two preferred trackers for this invention are the INTERSENSE (InterSense, Inc., 73 Second Avenue, Burlington, Mass. 01803, USA) IS-900™ and the INTERSENSE (InterSense, Inc., 73 Second Avenue, Burlington, Mass. 01803, USA) IS-600 Mark 2 Plus™.

HMD

The HMD 2, as stated above, can be either see-through or non-see-through in this invention. As most HMDs are too large to fit inside an SCBA mask, the preferred method of attachment to the SCBA mask is to cut out part or all of the transparent (viewing) portion of the mask to allow the bulk of the HMD to stick out, while placing the HMD optics close to the wearer's eyes. Holes drilled through the mask provide attachment points for the HMD. By drilling through the transparent portion of the mask, a generic solution can be achieved that does not depend upon the geometry of any particular SCBA mask or HMD. The preferred HMD for this invention is the VIRTUAL RESEARCH (Virtual Research Systems, Inc., 3824 Vienna Drive, Aptos, Calif. 95003) V6™ for a non-see-through method.

Headphones

Headphones 5 must be attached to the SCBA if audio is part of the AR application. Two requirements for the headphones are that they should not block out real-world sounds, and they should not interfere with donning the mask or other firefighter equipment. To accomplish these purposes, a pair of headphones (AIWA [AIWA AMERICA, INC., 800 Corporate Drive Mahwah, N.J. 07430] HP-A091 Stereo Headphones™) rigidly mounted to the SCBA mask at a distance from the wearer's ears can be used. See FIG. 3. Additional strength can be added to the shafts that connect the headphones to the SCBA by means of hardened epoxy resin, which can be accomplished with JB WELD™ (JB Weld Company, P.O. Box 483, Sulphur Springs, Tex. 75483).

SCBA Mask

Any SCBA mask 1 can be used with this invention. One preferred mask is the SCOTT (Scott Aviation, A Scott Technologies Company, Erie. Lancaster, N.Y. 14086) AV2000™. This mask is an example of the state of the art for firefighting equipment, and the design of the mask has a hole near the wearer's mouth that allows easy breathing and speaking when a regulator is not attached. When performing the integration of the invention, the mask face seal, the "catcher's mask" style straps for attaching the mask, and the nose cup are features that are preserved.

When integrating an AR display, it is also necessary to black out any view beyond the augmented reality portions of the user's field of view to ensure that the trainee's only view of the outside world is the AR view displayed to him/her by the HMD. In the case where an SCBA is used, the rest of the SCBA can be blacked out by using an opaque substance such as tape, foam, plastic, rubber, silicone, paint, or preferably a combination of plastic, silicone, and paint. This is done to ensure that the trainee doesn't see the un-augmented real world by using his or her un-augmented peripheral vision to see around AR smoke or other artificial (computer-generated virtual) obstacles.

Although specific features of the invention are shown in the drawing and not others, this is for convenience only, as each feature may be combined with any or all of the other features in accordance with the invention.

Other embodiments that will occur to those skilled in the art are within the following claims.

What is claimed is:

1. A system for creating a see-through augmented reality display, comprising:

a self-contained breathing apparatus (SCBA) mask to be worn by a user;

a motion tracker directly or indirectly coupled to the SCBA to track the user's field of view;

computer graphics rendered by a computer to be shown to the user, the computer graphics corresponding to the user's field of view as tracked by the motion tracker, so that the graphics appear to be anchored in 3-D space; and a see-through head-mounted display (HMD) mounted in front of the user's eyes on which the computer graphics are displayed, to combine the computer graphics with the user's view of the real world, wherein the non-augmented reality portion of the user's field of view is blocked from view by the user with opaque material such that only augmented reality imagery is visible to the user.

2. The system of claim 1, further comprising user headphones coupled to the SCBA mask.

3. The system of claim 2, further comprising shafts to connect the headphones to the SCBA mask, and wherein the shafts are filled with epoxy or other means to strengthen the shafts.

4. The system of claim 1 wherein the said opaque materials are selected from the group of materials consisting of tape, foam, plastic, rubber, silicone, paint, and combinations of these materials.

5. A system for creating a non-see-through augmented reality display, comprising:
- a self-contained breathing apparatus (SCBA) mask to be worn by a user;
- a video camera coupled to the SCBA mask, placed proximate the user's eyes and pointed away from the user;
- a motion tracker coupled to said camera;
- computer graphics rendered by a computer to be shown to the user, the computer graphics corresponding to the position and field of view of said camera; and
- a non-see-through head-mounted display (HMD) mounted in front of the user's eyes on which the computer graphics and the output of said camera is displayed, to combine the computer graphics with a view of the real world captured by said camera, wherein the non-augmented reality portion of the user's field of view is blocked from view by the user with opaque material such that only augmented reality imagery is visible to the user.

6. The system of claim 5, further comprising a second video camera coupled to the SCBA mask, for generating a stereoscopic view.

7. The system of claim 5, further comprising one or two mirrors placed in front of said camera to set the viewpoint of said camera to coincide with the user's eye location.

8. The system of claim 7, further comprising a rubber bumper placed around the mirror or mirrors.

9. The system of claim 7 wherein each mirror is placed in a mechanical clamp mount.

10. The system of claim 7, further comprising a structure for protecting each mirror from being bumped or hooked.

11. The system of claim 7 wherein each mirror is mounted on a mounting plate.

12. The system of claim 5, further comprising user headphones coupled to the SCBA mask.

13. The system of claim 12, further comprising shafts to connect the headphones to the SCBA mask, and wherein the shafts are filled with epoxy or other means to strengthen the shafts.

14. The system of claim 5 wherein the said opaque materials are selected from the group of materials consisting of tape, foam, plastic, rubber, silicone, paint, and combinations of these materials.

15. A system for creating a non-see-through augmented reality display, comprising:
- a self-contained breathing apparatus (SCBA) mask to be worn by a user;
- a video camera coupled to the SCBA mask;
- at least one mirrored surface placed in front of said camera, to alter the incoming viewing angle of said camera such that the viewpoint of said camera coincides with the user's eye location;
- a motion tracker coupled to said camera;
- computer graphics rendered by a computer to be shown to the user, the computer graphics corresponding to the position and field of view of said camera; and
- a non-see-through head-mounted display (HMD) mounted in front of the user's eyes on which the computer graphics and the output of said camera is displayed, to combine the computer graphics with a view of the real world captured by said camera.

16. The system of claim 15, further comprising a rubber bumper placed around the mirrored surface.

17. The system of claim 15 wherein each mirrored surface is placed in a mechanical clamp mount.

18. The system of claim 15, further comprising a structure for protecting each mirrored surface from being bumped or hooked.

19. The system of claim 15 wherein each mirrored surface is mounted on a mounting plate.

20. The system of claim 15, further comprising a second video camera coupled to the SCBA mask, for generating a stereoscopic view.

21. The system of claim 15 wherein the non-augmented reality portion of the user's field of view is blocked from view by the user with opaque material such that only augmented reality imagery is visible to the user.

22. The system of claim 21 wherein the said opaque materials are selected from the group of materials consisting of tape, foam, plastic, rubber, silicone, paint, and combinations of these materials.

23. The system of claim 15, further comprising user headphones coupled to the SCBA mask.

24. The system of claim 23, further comprising shafts to connect the headphones to the SCBA mask, and wherein the shafts are filled with epoxy or other means to strengthen the shafts.

* * * * *